(12) United States Patent
Peterson et al.

(10) Patent No.: US 7,740,190 B2
(45) Date of Patent: Jun. 22, 2010

(54) BOOM BREAKAWAY ASSEMBLY

(75) Inventors: John Peterson, Jackson, MN (US);
Steve Seubert, Sherburn, MN (US);
Dave Friesner, Estherville, IA (US)

(73) Assignee: AGCO Corporation, Duluth, GA (US)

( * ) Notice: Subject to any disclaimer, the term of this patent is extended or adjusted under 35 U.S.C. 154(b) by 490 days.

(21) Appl. No.: 11/444,159

(22) Filed: May 31, 2006

(65) Prior Publication Data
US 2007/0131791 A1    Jun. 14, 2007

Related U.S. Application Data

(60) Provisional application No. 60/685,856, filed on May 31, 2005.

(51) Int. Cl.
| | |
|---|---|
| B05B 1/20 | (2006.01) |
| B05B 3/00 | (2006.01) |
| E21B 19/00 | (2006.01) |
| B65F 1/00 | (2006.01) |
| B66C 23/00 | (2006.01) |
| A01B 17/00 | (2006.01) |
| A01B 63/00 | (2006.01) |
| A47F 5/00 | (2006.01) |
| E04G 3/00 | (2006.01) |
| F16M 13/00 | (2006.01) |
| E05F 1/14 | (2006.01) |
| F16C 11/00 | (2006.01) |

(52) U.S. Cl. .................... 239/159; 239/722; 239/737; 239/164; 239/166; 239/169; 414/22.55; 414/543; 414/686; 172/126; 172/456; 172/459; 248/900; 248/289.31; 248/292.11; 248/564; 16/281; 403/111

(58) Field of Classification Search .............. 239/159, 239/722, 727, 737, 726, 164, 165, 166, 167, 239/168, 169, 161; 414/22.55, 543, 686; 172/126, 456, 459; 16/281; 248/900, 289.31, 248/292.11, 564; 403/111
See application file for complete search history.

(56) References Cited

U.S. PATENT DOCUMENTS

| | | | | |
|---|---|---|---|---|
| 2,532,996 | A | * | 12/1950 | Otho et al. .................. 16/281 |
| 3,357,642 | A | * | 12/1967 | Donelson .................. 239/159 |
| 3,565,340 | A | * | 2/1971 | Meinert et al. ............. 239/168 |
| 3,580,340 | A | * | 5/1971 | Brown ...................... 172/126 |
| 4,221,353 | A | * | 9/1980 | Kuhn et al. ............ 248/292.11 |
| 4,441,655 | A | * | 4/1984 | Blumhardt ................ 239/163 |
| 4,595,140 | A | * | 6/1986 | Harden et al. ............. 239/167 |
| 4,643,358 | A | * | 2/1987 | Jackson .................... 239/166 |
| 5,000,385 | A | * | 3/1991 | Trusty et al. .............. 239/168 |
| 5,248,091 | A | * | 9/1993 | Thyberg .................... 239/168 |

(Continued)

Primary Examiner—Dinh Q Nguyen
Assistant Examiner—Steven Cernoch

(57) ABSTRACT

A boom breakaway assembly for a spray boom used by a vehicle. The boom breakaway assembly includes a reciprocating system having a first position and a second position, a retention system, and a bias system. In the first position, the bias system applies a maximum effective bias rate to the reciprocating system and the retention system applies a holding force upon the spray boom to maintain the spray boom in a desired outward position. In the second position, the bias system applies a minimal effective bias rate to the reciprocating system and the retention system reduces or disengages the holding force upon the spray boom, thereby allowing the spray boom to move from the outward position to a breakaway position when the spray boom encounters an obstacle. The bias system returns the reciprocating system to the first position once the spray boom clears the obstacle.

13 Claims, 4 Drawing Sheets

U.S. PATENT DOCUMENTS

| | | | |
|---|---|---|---|
| 5,950,926 A * | 9/1999 | Chahley et al. | 239/159 |
| 5,957,383 A * | 9/1999 | Benest | 239/166 |
| 5,992,534 A * | 11/1999 | Callies et al. | 172/126 |
| 6,027,039 A * | 2/2000 | Mercil | 239/159 |
| 6,119,963 A * | 9/2000 | Bastin et al. | 239/168 |
| 6,397,952 B1 * | 6/2002 | Hundeby | 172/126 |
| 6,719,213 B1 * | 4/2004 | Ferguson | 239/166 |
| 7,364,096 B1 * | 4/2008 | Sosnowski et al. | 239/168 |
| 2004/0238659 A1 * | 12/2004 | Wubben et al. | 239/166 |
| 2005/0184175 A1 * | 8/2005 | Wubben et al. | 239/722 |

* cited by examiner

BOOM BREAKAWAY ASSEMBLY

CROSS REFERENCE TO RELATED PATENT APPLICATIONS

This application claims the benefit of priority of U.S. Provisional Application No. 60/685,856, filed May 31, 2005, which is incorporated herein by reference.

TECHNICAL FIELD

The present invention relates generally to a boom breakaway assembly, and, in particular, to a boom breakaway assembly having an effective spring rate that quickly diminishes upon the boom encountering an intrusive object.

BACKGROUND OF THE INVENTION

Boom assemblies are generally used in the agricultural industry for spraying liquids, such as herbicides, insecticides, and pesticides. Typically, the boom assemblies are attached to farm vehicles adapted to traverse cultivated fields having varying contours. More particularly, the boom assemblies comprise a number of aligned sprayers in communication with a tank of liquid transported by the farm vehicle. The booms are used for spreading the liquid along a substantially wide path provided by the movement of the farm vehicle. Two boom assemblies are generally connected to the rear of the farm vehicle, such that a first boom assembly extends outwardly to the left of the farm vehicle and a second boom assembly extends outwardly to the right of the farm vehicle.

The desire to have the boom assemblies cover a significant area of the field during the application of the liquid has resulted in the construction of lightweight boom assemblies using a lattice framework. Accordingly, common booms extend from twenty to twenty-five feet in total length. Using lightweight materials to construct the boom assemblies has decreased the durability of the boom. Consequently, a boom can suffer extensive damage, if the boom assembly comes in contact with an intrusive obstacle or abutment such as a tree, rock, or post.

Prior to the use of boom breakaway assemblies, booms were susceptible to irreparable damage or breakage when encountering an unforgiving object in the field. Boom breakaway assemblies allow the boom to give or break away when coming in contact with an object, thereby preventing damage to the boom. Generally, a boom breakaway assembly utilizes an outer boom portion pivotally connected to an inner boom portion. The pivot permits the outer boom portion to horizontally pivot in response to contact by an object. Additionally, the outer boom portion (or the middle and outer boom portions) may be capable of pivoting vertically to overcome an obstacle in its path.

Not only is the boom capable of pivoting away from the intrusive object, the boom is often capable of automatically returning to a desired outward position once the boom has cleared the intrusive object. More specifically, a spring or coil is used to return the outward boom portion to a desired outward position (e.g., perpendicular to the travel of the farm vehicle) after the boom has cleared the obstacle.

Typical boom breakaway assemblies, however, require a high holding force to keep proper tension on the breakaway joint, to minimize undesired motion of the boom parts during use. The high holding force, generally provided by a spring or coil, remains constant even after the outward boom portion comes in contact with an obstacle in the field. Consequently, damage can occur to the boom structure until the obstacle is cleared. Although the spring permits the outer boom portion to breakaway during contact with an obstacle, the spring continues to exert a holding force (e.g., an effective spring rate) on the outer boom portion, thereby attempting to return the outer boom portion to the desired outward position. Such constant holding force increases the impact force during the entire contact period with the obstacle-effectively dragging the outer boom portion over the obstacle.

What is needed is a boom breakaway assembly that quickly and temporarily reduces the holding force of a bias (or the effective spring rate of a spring) until the outer boom portion clears an intrusive object. It is to such a device that the present invention is primarily directed.

BRIEF SUMMARY OF THE INVENTION

Briefly described, in preferred form, the present invention is a boom breakaway assembly for a spray boom used by a vehicle, such as a self-propelled field application vehicle. The boom breakaway assembly includes a reciprocating system having a first position and a second position, a retention system for moving the reciprocating system from the first position to the second position, and a bias system for moving the reciprocating system from the second position to the first position.

In the first position, the bias system applies a maximum effective bias rate to the reciprocating system and, therefore, the retention system. Accordingly, the retention system applies a holding force upon an outer boom portion of the spray boom thereby maintaining the outer boom portion in a desired outward position. In the second position, the bias system applies a minimal effective bias rate to the reciprocating system and, therefore, the retention system. Thus, the retention system reduces or disengages the holding force upon the outer boom portion, thereby allowing the outer boom portion to move from the outward position to a breakaway position when the outer boom portion encounters an obstacle.

Although the present invention described above refers to systems, the physical elements of the present invention include a bias element having an effective bias rate, a bias mounting element, a bias anchor element, a retention element, a retention mounting element, a retention anchor element, a reciprocating plate element, a reciprocating bracket element, and a reciprocating pivot element.

The bias mounting element connects the distal end of the bias element with the distal end of an inner boom portion of the spray boom. The bias anchor element connects the proximate end of the bias element with an upper end of the reciprocating plate element. Accordingly, when the reciprocating plate element is in a first position, the bias element applies a maximum effective bias rate to the upper end of the reciprocating plate element.

The retention mounting element connects the distal end of the retention element with the proximate end of a middle boom portion of the spray boom. The retention anchor element connects the proximate end of the retention element with a lower end of the reciprocating plate element. Accordingly, when the reciprocating plate element is in the first position, the maximum effective bias rate of the bias element is applied to the retention element. Consequently, the retention element applies a resulting holding force to the middle boom portion of the spray boom, thereby maintaining the spray boom in the outward position.

The reciprocating bracket element connects the reciprocating plate element to the inner boom portion of the spray boom. The reciprocating pivot element is positioned within apertures of the reciprocating bracket element and the reciprocating plate element, such that the reciprocating pivot element allows the reciprocating plate element to eccentrically rotate between the first position and a second position.

When an outer boom portion of the spray boom engages an obstacle, the outer boom portion moves from the outward position to a breakaway position and, therefore, creates a pulling force upon the retention element. The pulling force upon the retention element effectively pulls upon the lower end of the reciprocating plate element via the retention anchor element. Accordingly, the reciprocating plate element rotates from the first position to the second position. As the reciprocating plate element rotates to the second position, the upper end of the reciprocating plate creates a pulling force upon the bias element via the bias anchor element. The bias element is therefore elongated and the effective bias rate of the bias element is rapidly dissipated to a minimal effective bias rate. Further, the minimal effective bias rate reduces the holding force applied by the retention element upon the outer boom portion of the spray boom. Such a reduced holding force permits the outer boom portion to easily move to the breakaway position and, thereby, clear the encountered obstacle.

After the outer boom portion clears the encountered obstacle, the bias element retracts and causes an opposite pulling force upon the upper end of the reciprocating plate element. Accordingly, the reciprocating plate element eccentrically rotates from the second position back to the first position, whereby the effective bias rate is maximized. The rotation of the reciprocating plate element creates an opposite pulling force upon the retention element via the retention anchor element. Such an opposite pulling force increases the holding force applied by the retention element upon the outer boom portion. Accordingly, the outer boom portion moves from the breakaway position back to the desired outward position.

A principle object of the present invention is to provide a boom breakaway assembly that permits a spray boom to move from an outward position to a breakaway position when the spray boom encounters an obstacle.

Another object of the present invention is to provide a boom breakaway assembly having a bias element that provides a maximum bias rate that indirectly creates a holding force upon the spray boom to maintain the spray boom in an outward position.

Still another object of the present invention is to provide a boom breakaway assembly that quickly dissipates the maximum effective bias rate to a minimal level upon the spray boom encountering an obstacle.

It is another object of the present invention to provide a boom breakaway assembly that returns the effective bias rate to the maximum level once the spray boom clears the encountered obstacle.

Yet another object of the present invention is to provide a boom breakaway assembly having a reciprocating plate element that rotates from a first position to a second position when the spray boom encounters an obstacle, thereby causing the effective bias rate to rapidly decrease.

Another object of the present invention is to provide a boom breakaway assembly having a reciprocating plate element that rotates from the second position to the first position once the spray boom clears the obstacle, thereby returning the effective bias rate to the maximum level.

These and other objects, features and advantages of the present invention will become more apparent upon reading the following specification in conjunction with the accompanying drawings.

DETAILED DESCRIPTION OF THE PREFERRED EMBODIMENTS

Figure 1:
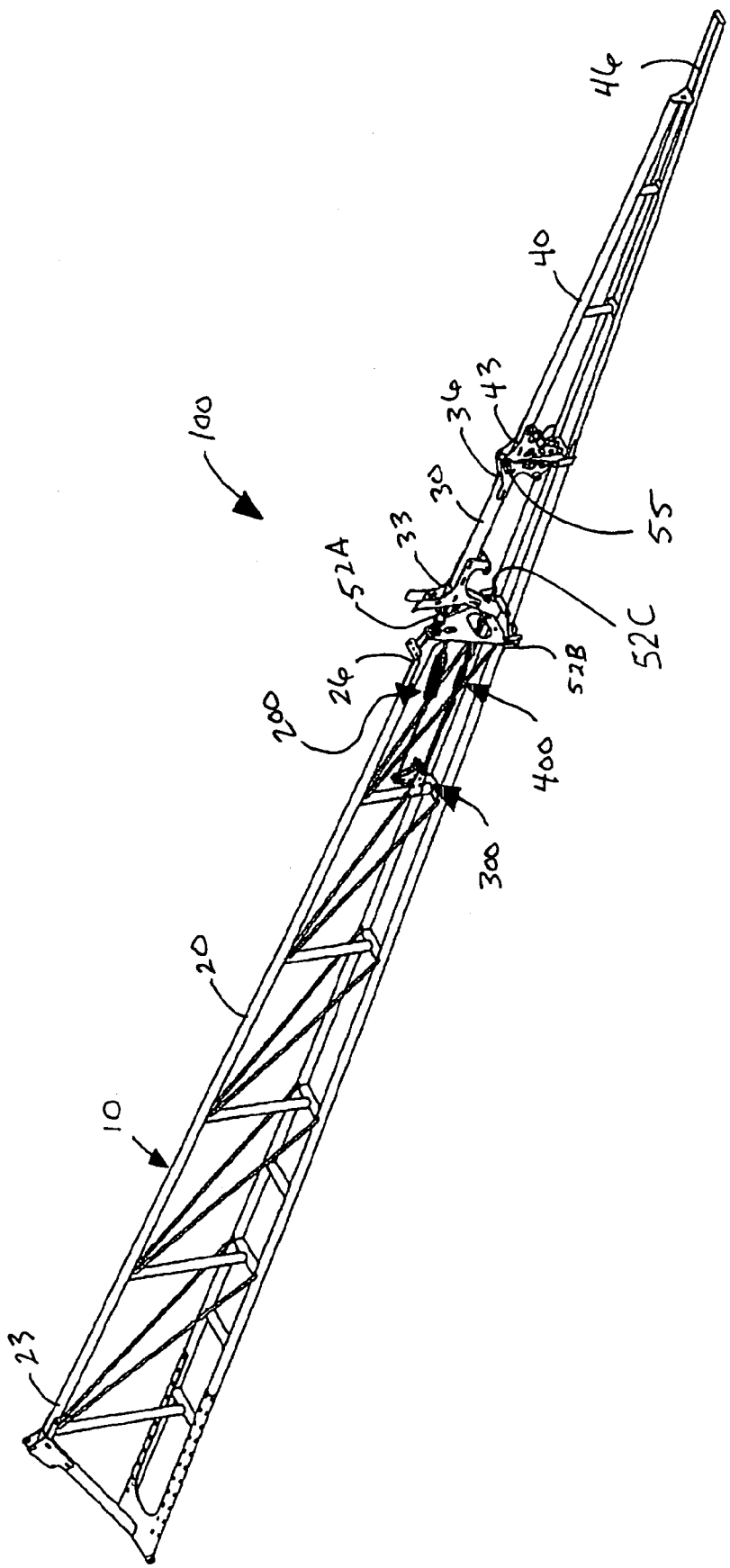
FIG. 1 illustrates a perspective view of a boom breakaway assembly in accordance with preferred embodiments of the present invention.

Referring now in detail to the drawing figures, wherein like reference numerals represent like parts throughout the several views, a boom breakaway assembly 100 of FIG. 1 is typically mounted on a vehicle (not shown) used to spray liquids, such as herbicides, insecticides, and pesticides on fields of varying contours. Although FIG. 1 illustrates only one boom breakaway assembly 100, one skilled in the art will recognize that more than one boom breakaway assembly 100 is generally mounted to the vehicle, such as a farm implement or self-propelled field application vehicle, during use. For example, a self-propelled field application vehicle can have two booms 10, each with a boom breakaway assembly 100 contained therein, attached to the rear of the self-propelled field application vehicle, such that a first boom 10 extends outwardly to the left of the self-propelled field application vehicle and a second boom 10 extends outwardly to the right of the self-propelled field application vehicle. Each boom 10 typically extends in an outward position during use, whereby the boom 10 (and therefore the boom breakaway assembly 100) is substantially perpendicular to the path of the self-propelled field application vehicle and substantially parallel with the applicable field to be sprayed.

As illustrated in FIG. 1, a spray boom 10 generally comprises an inner boom portion 20 having a proximate end 23 and a distal end 26; a middle boom portion 30 having a proximate end 33 and a distal end 36; and an outer boom portion 40 having a proximate end 43 and a distal end 46. Typically, the proximate end 23 of the inner boom portion 20 is in communication with the rear of the vehicle, while the distal end 26 of the inner boom portion 20 pivotally connects to the proximate end 33 of the middle boom portion 30. A plurality of proximate boom pivot hinges 52A-C are positioned between and in communication with the distal end 26 of the inner boom portion 20 and the proximate end 33 of the middle boom portion 30, such that the proximate boom pivot hinges 52A-C are adapted to permit the middle boom portion 30 and, therefore, the outer boom portion 40 to horizontally and upwardly rotate from the outward position, when the outer boom portion 40 encounters an intrusive object. Similarly, the distal end 33 of the middle boom portion 30 pivotally connects to the proximate end 43 of the outer boom portion 40. A distal boom pivot hinge 55 is positioned between and in communication with the distal end 33 of the middle boom portion 30 and the proximate end 43 of the outer boom portion 40, such that the distal boom pivot hinge 55 is adapted to permit the outer boom portion 40 to vertically rotate from the outward position, when the outer boom portion 40 encounters an intrusive object. One skilled in the art will recognize that the plurality of proximate boom pivot hinges 52A-C and the distal boom pivot hinge 55 can comprise a plurality of pivot pins or rivets slideably received by first and second hinge plates.

The boom breakaway assembly device 100 is generally contained within the inner boom portion 20 and is adapted to apply a holding force (e.g., tension) upon the middle boom portion 30 and the outer boom portion 50 in order to maintain the boom 10 in an outward position substantially perpendicular to the path of the vehicle. Such an outward position is desired to ensure adequate and uniform spray coverage of the field during operation of the vehicle.

Figure 2:
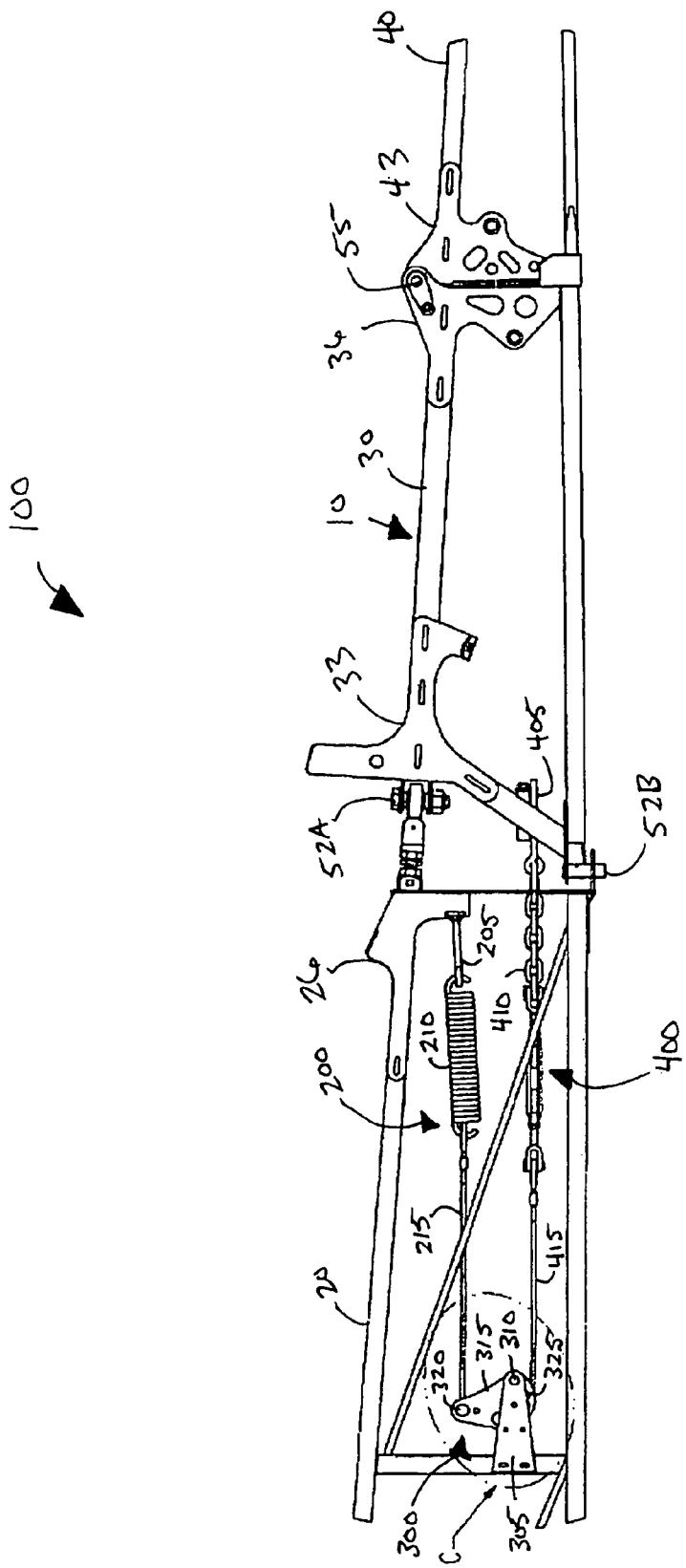
FIG. 2 illustrates a sectional view of a boom breakaway assembly in accordance with preferred embodiments of the present invention.
Figure 3:
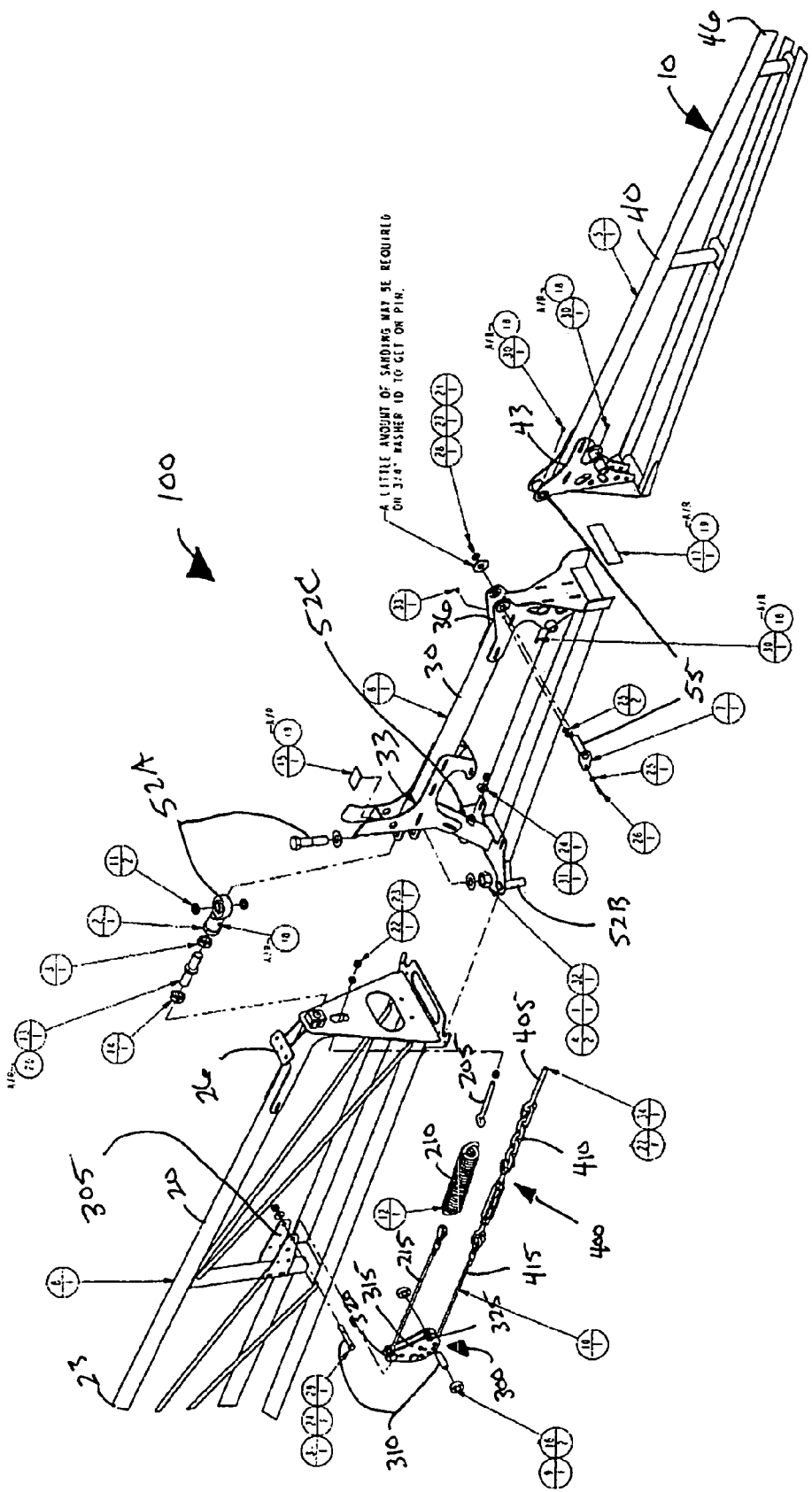
FIG. 3 illustrates an expanded view of a boom breakaway assembly in accordance with preferred embodiments of the present invention.

As shown in FIGS. 1, 2, and 3, the boom breakaway assembly device 100 comprises a bias system 200 having an effective bias rate, a retention system 400 adapted to maintain the boom 10 in the outward position, and a reciprocating system 300 adapted to minimize the effective bias rate of the bias system 200 applied to the retention system 400 when the middle boom portion 30 or outer boom portion 40 (sometimes collectively referred to herein as the outer boom portion 40) engages an obstacle, such as a rock, tree, post, or similar object.

The bias system 200 is containable within the inner boom portion 20 and is adapted to allow the outer boom portion 40 to move between the outward position and a breakaway position. More specifically, the effective bias rate of the bias system 200 provides the retention system 400 with a holding force capable of maintaining the outer boom portion 40 in the outward position. When the outer boom portion 40 encounters an obstacle, the resiliency of the bias system 200 temporarily reduces the holding force of the retention system 200, thereby permitting the outer portion 40 of the boom 10 to move from the outward position.

As the retention system 400 maintains the outer boom portion 40 in the outward position, the bias system 200 has a maximum effective bias rate. When the outer boom portion 40 of the spray boom 10 encounters an obstacle, the reciprocating system 300, which is in communication with the bias system 200 and the retention system 400, rotates to rapidly minimize the effective bias rate of the bias system 200 and, therefore, temporarily disengages the retention system 400. Accordingly, the outer boom portion 40 of the boom 10 can quickly and easily move from the outward position to a breakaway position, thereby permitting the outer boom portion 40 to clear the obstacle without damage.

In an embodiment of the present invention, the bias system 200 comprises a bias element 210, a bias mounting element 205, and a bias anchor element 215. The bias mounting element 205 is in communication with a distal end of the bias element 210 and the distal end 26 of the inner boom portion 20. The bias anchor element 215 is in communication with the reciprocating system 300 and a proximate end of the bias element 210. One skilled in the art will recognize that the bias element 210 can comprise a spring, coil, or similar resilient member that has an effective bias rate, such as an effective spring rate.

The bias mounting element 205 is adapted to maintain the distal end of the bias element 210 in a predetermined position near the distal end 26 of the inner boom portion 20. As an opposing force is applied to the bias element 210 from the bias anchor element 215 (e.g., an opposing force applied by the reciprocating system 300), the bias mounting element 205 permits application of the effective bias rate of the bias element 210 upon the bias anchor element 215. The bias mounting element 205 is preferably a connection bolt fixed to the distal end 26 of the inner boom portion 20 and the distal end of the bias element 210.

The bias anchor element 215 is adapted to apply an opposing force to the proximate end of the bias element 210, when an opposing force is applied upon the bias anchor element 215 by the reciprocating system 300. Such an opposing force generally originates from the outer boom portion 40 moving from the outward position, thereby creating a breakaway force upon the retention system 400, which, consequently, applies the breakaway force upon the reciprocating system 300. The bias anchor element 215 preferably comprises a connection cable that connects the bias element 210 to the reciprocating system 300.

In an embodiment of the present invention, the retention system 400 comprises a retention element 410, a retention mounting element 405, and a retention anchor element 415. The retention mounting element 405 is in communication with a distal end of the retention element 410 and the proximate end 33 of the middle boom portion 30. The retention anchor element 415 is in communication with the reciprocating system 300 and a proximate end of the retention element 410. One skilled in the art will recognize that the retention element 410 can comprise a chain, cable, coupling, other suitable and similar rigid member, or combination thereof that can effectively maintain and withstand the holding force applied to the outer boom portion 40 of the spray boom 10 when in the outward position.

The retention mounting element 405 is adapted to maintain the distal end of the retention element 410 in a predetermined position near the proximate end 33 of the middle boom portion 30. As the outer boom portion 40 moves from the outward position to the breakaway position, a pulling force is applied to the retention element 410 by the retention mounting element 405. The retention mounting element 405 is preferably a connection bolt fixed to the proximate end 33 of the inner boom portion 30 and the distal end of the retention element 410.

The retention anchor element 415 is adapted to apply an opposing force to the proximate end of the retention element 210, when the bias element 210 applies an opposing force via the bias anchor element 215 to the reciprocating system 300. Such an opposing force generated by the bias element 210 generally occurs after the outer boom portion 40 of the spray boom 10 clears the obstacle. The opposing force applied by the retention anchor element 415 to the retention element 410 effectively applies a holding force upon the outer boom portion 40 of the spray boom 10, thereby causing the outer boom portion 40 to move from the breakaway position back to the desired outward position. The retention anchor element 415 preferably comprises a connection cable that connects the retention element 410 to the reciprocating system 300.

Figure 4:
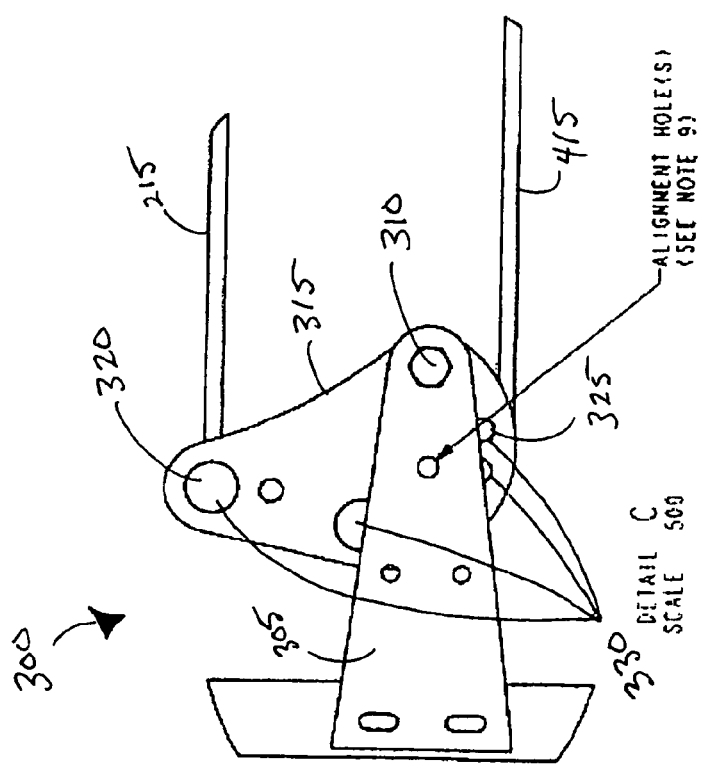
FIG. 4 illustrates a sectional view of a reciprocating release system in accordance with preferred embodiments of the present invention.

As illustrated in FIG. 4, the reciprocating system 300 comprises a reciprocating plate element 315, a reciprocating bracket element 305, and a reciprocating pivot element 310. The reciprocating plate element 315 is generally in communication with the bias anchor element 215 and the retention anchor element 415. One skilled in the art will recognize that the reciprocating plate element 315 can comprise a plate, block, cam, or other similar mechanism having a generally oval shape. The reciprocating plate element 315 preferably has a kidney-bean or nautilus like shape having a narrow upper end and a wide lower end.

As shown in FIGS. 2 and 3, the reciprocating bracket element 305 is in communication with the reciprocating plate element 315 and the inner boom portion 20. The reciprocating bracket element 305 and reciprocating plate element 315 are formed to define horizontally aligned pivot apertures, such that the reciprocating pivot element 310 is slideably received within the horizontally aligned pivot apertures of the reciprocating bracket element 305 and the reciprocating plate element 315. Accordingly, the reciprocating pivot element 310 is in communication with the reciprocating plate element 315 and the reciprocating bracket element 305, such that the reciprocating pivot element 310 is adapted to allow the reciprocating plate element 315 to pivotally rotate between a first position and a second position. The reciprocating plate element 315 is in the first position when the outer boom portion 40 is in the outward position and is in the second position when the outer boom portion 40 is in the breakaway position after encountering an obstacle. One skilled in the art will recognize that the reciprocating pivot element 310 can comprise a pivot pin, hinge, rivet, or other comparable mechanism adapted to allow the reciprocating plate element 315 to pivotally rotate from the first position to the second position. If an obstacle is encountered, the reduction in force is proportional to the angle required to clear the obstacle (i.e., "spray position," or substantially perpendicular to the travel of the farm vehicle corresponds to full force whereas greater than 70 degrees offset from perpendicular to the travel of the farm vehicle corresponds to minimum force).

Referring to FIG. 4, one embodiment of the present invention shows the reciprocating plate element 315 comprises an upper mounting coupling 320 and a lower mounting coupling 325. The upper mounting coupling 320 is positioned near the narrow upper end of the reciprocating plate element 315 and is in communication with a proximate end of the bias anchor element 215. The lower mounting coupling 325 is positioned near the wide lower end of the reciprocating plate element 315 and is in communication with a proximate end of the retention anchor element 415.

When the reciprocating plate element 315 is in the first position, the distance (D1) between the bias anchor element 215 (connected to the upper mounting coupling 320) and the reciprocating pivot element 310 is significantly greater than the distance (D2) between the retention anchor element 415 (connected to the lower mounting coupling 325) and the reciprocating pivot element 310. Such a configuration permits the retention element 410 to apply a significant holding force (F2) upon the outer boom portion 40, while the bias element 210 need only apply a minimal effective bias rate (F1) upon the reciprocating plate element 315. In other words, the distance (D1) plus the effective bias rate (F1) equals the distance (D2) plus the holding force (F2).

When reciprocating plate element 315 is in the second position, however, the distance (D3) between the bias anchor element 215 (connected to the upper mounting coupling 320) and the reciprocating pivot element 310) is less than the distance (D4) between the retention anchor element 415 (connected to the lower mounting coupling 325) and the reciprocating pivot element 310. Such a configuration permits the retention element 410 to apply a minimal holding force (F4) upon the outer boom portion 40, while the bias element 210 applies a maximum effective bias rate (F3) upon the reciprocating plate element 315. In other words, the distance (D3) plus the effective bias rate (F3) equals the distance (D4) plus the holding force (F4). After the outer boom portion 40 clears the obstacle, the maximum effective bias rate applied by the bias element 210 moves the reciprocating plate element 315 back to the first position.

The horizontally aligned pivot apertures of the reciprocating bracket element 305 and the reciprocating plate element 315 can be positioned off the center of the reciprocating plate element 315. Accordingly, the reciprocating pivot element 310 is also positioned off the center of the reciprocating plate element 315, thereby permitting the reciprocating plate element 315 to eccentrically rotate between the first position and the second position. More specifically, the reciprocating pivot element 310 can be positioned near the wide bottom end of the reciprocating plate element 315, such that when the reciprocating plate element 315 rotates between the first and second positions the wide bottom end of the reciprocating plate element 315 rotates a substantially shorter distance than the narrow upper end of the reciprocating plate element 315. Such a configuration of the reciprocating pivot element 310 allows the effective bias rate, indirectly applied to the retention element 410 by the bias element 210, to rapidly dissipate when the reciprocating plate element 315 rotates from the first position to the second position.

When the outer boom portion 40 engages an obstacle, the reciprocating plate element 315 rotates from the first position to the second position. The rotation of the reciprocating plate element 315 causes the effective bias rate of the bias element 210 to drop from a predetermined maximum to a minimum in a very short period of time. As the effective bias rate of the bias element 210 determines the holding force of the retention element 410, the rotation of the reciprocating plate element 315 from the first position to the second position minimizes the holding force of the retention element 410 upon the outer boom portion 40 of the spray boom 10. Accordingly, little opposing force is applied to the outer boom portion 40 as it clears the obstacle, thereby preventing the outer boom portion 40 from being dragged over the obstacle. In other words, there is no added impact of the outer boom portion 40 with the obstacle caused by the retention element 410 of the bias breakaway assembly 100. With a minimized holding force applied by the retention element 410, the outer boom portion 40 can easily move from the outward position to the breakaway position to effectively clear the obstacle. When an obstacle is encountered, the reduction in force is proportional to the angle required to clear the obstacle (i.e., "spray position," or substantially perpendicular to the travel of the farm vehicle corresponds to full force whereas greater than 70 degrees offset from perpendicular to the travel of the farm vehicle corresponds to minimum force).

Once the outer boom portion 40 clears the obstacle, the bias element 210 moves the reciprocating plate element 315 from the second position to the first position, thereby returning the effective bias rate to the predetermined maximum value. Accordingly, the holding force of the retention element 410 returns to normal and, thus, the outer boom portion 40 is returned to the outward position from the breakaway position.

In an alternative embodiment of the present invention, the retention anchor element 405 and the bias retention anchor element 205 comprise only one anchor element that wraps around the perimeter of one side of the reciprocating plate element 315. The reciprocating plate element 315 further comprises a plurality of anchor guide mounts 330 aligned along the outer perimeter of the reciprocating plate element 315. The reciprocating plate element 315, therefore, acts as a pulley mechanism between the bias element 210 and the retention element 410. Under this configuration, the effective bias rate is directly applied to the retention element 410 from the bias element 210. Moreover, the bias element 210 directly affects the holding force applied to the outer boom element 40 by the retention element 410. The reciprocating plate element 315 continues to minimize the effective bias rate of the bias element 210 and the holding force of the retention element 410, when the reciprocating plate element 315 rotates from the first position to the second position.

In operation, the boom breakaway assembly 100 maintains the spray boom 10 in an outward position until the spray boom 10 encounters an obstacle. The spray boom 10 can then pivot away from the obstacle to properly clear the obstacle before the spray boom 10 is returned to the outward position. More specifically, the bias element 210 applies a maximum effective bias rate to the reciprocating plate element 315 (currently in a first position), which indirectly controls the holding force applied to the outer boom portion 40 by the retention element 410. The holding force applied by the retention element 410 effectively maintains the outer boom portion in a desired outward position. When the outer boom portion 40 engages an obstacle, the outer boom portion 40 rotates from the outward position to a breakaway position. As the outer boom portion 40 moves from the outward position to the breakaway position, the outer boom portion 40 causes a pulling force to be applied to the retention element 410. The pulling force applied to the retention element 410 is also applied to the wide lower end of the reciprocating plate element 315 by the retention anchor element 415.

Accordingly, the reciprocating plate element 315 eccentrically rotates from the first position to a second position. The movement of the reciprocating plate element 315 to the second position causes the narrow upper end of the reciprocating plate element 315 to rotate substantially, thereby applying a pulling force on the bias element 210 through the bias anchor element 215. As the bias element 210 is quickly elongated by the pulling force of the reciprocating plate element 315, the effective bias rate of the bias element 210 rapidly decreases to a minimum level. Such a rapid decrease in the effective bias rate quickly reduces the holding force applied by the retention element 410 upon the outer boom portion 40.

A minimal holding force upon the outer boom portion 40 permits the outer boom portion 40 to effectively clear the encountered obstacle, without any undesirable resistance caused by an opposing holding force of greater strength. Once the outer boom portion 40 clears the obstacle, the bias element 210 retracts, thereby pulling the narrow upper end of the reciprocating plate element 315 with an increasing effective bias rate. The reciprocating plate element 315, therefore, eccentrically rotates from the second position back to the first position. As the reciprocating plate element 315 rotates to the first position, the holding force applied upon the outer boom portion 40 by the retention element 410 increases (as does the effective bias rate of the bias element 210). Thus, the holding force applied by the retention element 410 moves the outer boom portion 40 back to the desired outward position.

One skilled in the art will recognize that the changes in the effective bias rate and the holding force continuously occur as the reciprocating plate element 315 rotates between the first and second position. The first and second positions are not discrete and, therefore, the changes in the effective bias rate and holding force can be adequate without fully moving the reciprocating plate element 315 from the first position all the way to the second position.

One skilled in the art will recognize that the components of the bias system 200, the reciprocating system 300, and the retention system 400 can be made of a variety of suitable materials including, but not limited to, plastic, rubber, metal, or other suitable materials or a combination thereof.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. In a spray boom operable to be mounted on an agricultural vehicle, said spray boom including an inner boom portion, an outer boom portion swingable relative to the inner boom portion from an extended operating position to a relatively folded breakaway position when an obstacle is encountered, and a boom breakaway assembly, the boom breakaway assembly comprising:
    a bias system connected to one of the inner and outer boom portions,
    said bias system including a spring that provides an effective bias rate yieldably forcing the outer boom portion into the operating position;
    a retention system connected to the other of the inner and outer boom portions; and
    a reciprocating system operably interconnecting the bias and retention systems so as to provide a variable holding force on the outer boom portion that is minimized once the outer boom portion engages the obstacle and has swung out of the operating position,
    said reciprocating system operable to vary the holding force between a maximum holding force and a relatively smaller minimized holding force based upon the position of the outer boom portion relative to the inner boom portion,
    said reciprocating system including a reciprocating element pivoting between first and second positions in response to swinging of the outer boom portion between the operating and breakaway positions, with the first position corresponding to the operating position and the second position corresponding to the breakaway position,
    said reciprocating system being configured so that the first position of the reciprocating element corresponds with the maximum holding force and second position of the reciprocating element corresponds with the minimized holding force.

2. The boom breakaway assembly of claim 1, wherein the bias system comprises:
    a bias mounting element in communication with a distal end of the spring and a distal end of said one of the boom portions; and
    a bias anchor element in communication with the reciprocating system and a proximate end of the spring.

3. The boom breakaway assembly of claim 2, wherein the bias mounting element comprises a connection bolt.

4. The boom breakaway assembly of claim 2, wherein the bias anchor element comprises a connection cable.

5. The boom breakaway assembly of claim 2, wherein the retention system comprises:
    a retention element;
    a retention mounting element in communication with a distal end of the retention element and a proximate end of the other boom portion; and
    a retention anchor element in communication with the reciprocating system and a proximate end of the retention element.

6. The boom breakaway assembly of claim 5,
    said reciprocating element comprising a reciprocating plate element in communication with the bias anchor element and the retention anchor element;

said reciprocating system including a reciprocating bracket element in communication with the reciprocating plate element; and said reciprocating system further including a reciprocating pivot element in communication with the reciprocating plate element and the reciprocating bracket element, wherein the reciprocating pivot element allows the reciprocating plate element to rotate between the first and second positions.

7. The boom breakaway assembly of claim 1, said reciprocating element comprising a reciprocating plate pivotal about a pivot point, said reciprocating plate being attached to the bias system at a first location and to the retention system at a second location.

8. The boom breakaway assembly of claim 7, said pivot point is positioned off the center of the reciprocating plate.

9. The boom breakaway assembly of claim 7, said spring moves the reciprocating plate from the second position to the first position once the outer boom portion has avoided the obstacle.

10. The boom breakaway assembly of claim 7, said pivot point being positioned closer to one of the first or second attachment locations.

11. The boom breakaway assembly of claim 10, said attachment locations being spaced apart along a common line, said pivot point being spaced from the line.

12. The boom breakaway assembly of claim 11, said reciprocating plate being irregularly shaped.

13. The boom breakaway assembly of claim 12, said reciprocating plate being kidney bean or nautilus shaped.

* * * * *